US012119696B2

(12) United States Patent
Chan et al.

(10) Patent No.: US 12,119,696 B2
(45) Date of Patent: Oct. 15, 2024

(54) METHOD AND APPARATUS PERFORMING CHARGING MODULATION

(71) Applicant: Geoffrey Loong Chan, Hong Kong (HK)

(72) Inventors: Geoffrey Loong Chan, Hong Kong (HK); Wai Lei, Hong Kong (HK); Kin Hing Yau, Hong Kong (HK)

(73) Assignee: Geoffrey Loong Chan, Hong Kong (HK)

( * ) Notice: Subject to any disclaimer, the term of this patent is extended or adjusted under 35 U.S.C. 154(b) by 491 days.

(21) Appl. No.: 17/535,681

(22) Filed: Nov. 25, 2021

(65) Prior Publication Data

US 2022/0166243 A1 May 26, 2022

Related U.S. Application Data

(60) Provisional application No. 63/118,732, filed on Nov. 26, 2020.

(51) Int. Cl.
*H02J 7/00* (2006.01)
*B60L 53/63* (2019.01)
*B60L 53/66* (2019.01)
*B60L 58/12* (2019.01)

(52) U.S. Cl.
CPC .......... *H02J 7/00712* (2020.01); *B60L 53/63* (2019.02); *B60L 53/66* (2019.02); *B60L 58/12* (2019.02); *H02J 7/00032* (2020.01); *H02J 7/0048* (2020.01); *H02J 7/0071* (2020.01)

(58) Field of Classification Search
USPC ........................................................ 320/109
See application file for complete search history.

(56) References Cited

U.S. PATENT DOCUMENTS

| 2010/0145540 | A1* | 6/2010 | McKenna | ............. | B60L 53/665 700/295 |
| 2014/0021917 | A1* | 1/2014 | Paupert | .................. | B60L 53/68 320/109 |
| 2017/0015210 | A1* | 1/2017 | Juhasz | .................. | B60L 53/665 |

* cited by examiner

*Primary Examiner* — Samuel Berhanu
(74) *Attorney, Agent, or Firm* — Idea Intellectual Limited; Margaret A. Burke; Sam T. Yip (57) ABSTRACT

A method for performing a charging modulation between one or more charging poles, a local power system and a global power system is provided, the method comprising: receiving monitoring data from one or more measuring devices; receiving controlling data from the global power system, the local power system, a customer management system, and the one or more charging poles; identifying one or more measuring values corresponding to phases of a three-phase power system according to the monitoring data; adjusting the charge level of a target phase of a target charging electricity by determining whether the target measuring value of the target phase of the target charging electricity exceeds an allowed charging range according to one or more measuring values; and determining whether to turn the target phase of the provided target charging electricity off or on according to current charge level of the target phase.

10 Claims, 6 Drawing Sheets

METHOD AND APPARATUS PERFORMING CHARGING MODULATION

CROSS-REFERENCE TO RELATED APPLICATIONS

The present application claims priority from the U.S. Provisional Patent Application No. 63/118,732 filed on Nov. 26, 2020, and the disclosure of which is incorporated herein by the reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a charging modulation, and in particular, to charging modulation between one or more charging poles, a local power system and a global power system according to received monitoring data and different controlling data.

BACKGROUND OF THE INVENTION

The battery of an electric vehicle (EV) normally obtains its power from a local power system through charge poles. The power drawn by each EV ranges from 7 to 50 KW, which poses a considerable burden to electric power systems. To counteract this, an EV battery's charging rate can be modulated in magnitude and time to reduce the burden on an electric power system locally and system-wide.

Therefore, there is a need in the art for a method to adaptively modulate EV charging via groups of charging poles connected to the electric power system to reduce the burden on the power system both locally and system wide.

SUMMARY OF THE INVENTION

In accordance with one aspect of the present invention, a computer-implemented method is provided for performing a charging modulation between one or more charging poles, a local power system, and a global power system by one or more control units of a charging pole power management system. The charging pole power management system comprises the one or more charging poles and the one or more control units having one or more processors. The method comprises receiving, by the processors, monitoring data from one or more measuring devices, wherein the one or more measuring devices assigned to one or more cutoff points of a power grid correspond to the one or more charging poles, the local power system, and the global power system; receiving, by the processors, controlling data first from a global power system, then second from one or more measurement points of a local power system, third from the customer management system, and fourth from one or more charging poles; identifying, by the processors, one or more measuring values corresponding to phase(s) of a three-phase or a single phase power system according to the monitoring data; adjusting, by the processors, a charge level of a target phase of a target charging electricity by determining whether a target measuring value of the target phase of the target charging electricity exceeds an allowed charging range or below the allowed charging range according to the one or more measuring values, wherein an electric vehicle is charged via a target charging pole providing the target charging electricity; and determining, by the processors, whether to turn the target phase of the provided target charging electricity on or off according to the target phase's current charge level.

In accordance with another aspect of the present invention, a charging pole power management system for performing a charging modulation is provided, and the charging pole power management system comprises a processor or an array of processors configured to execute machine instructions to implement the method described above.

BRIEF DESCRIPTION OF THE DRAWINGS

Embodiments of the invention are described in more details hereinafter with reference to the drawings, in which.

DETAILED DESCRIPTION

In the following description, methods and systems for performing a charging modulation between one or more charging poles, local power system, and global power system are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 1:
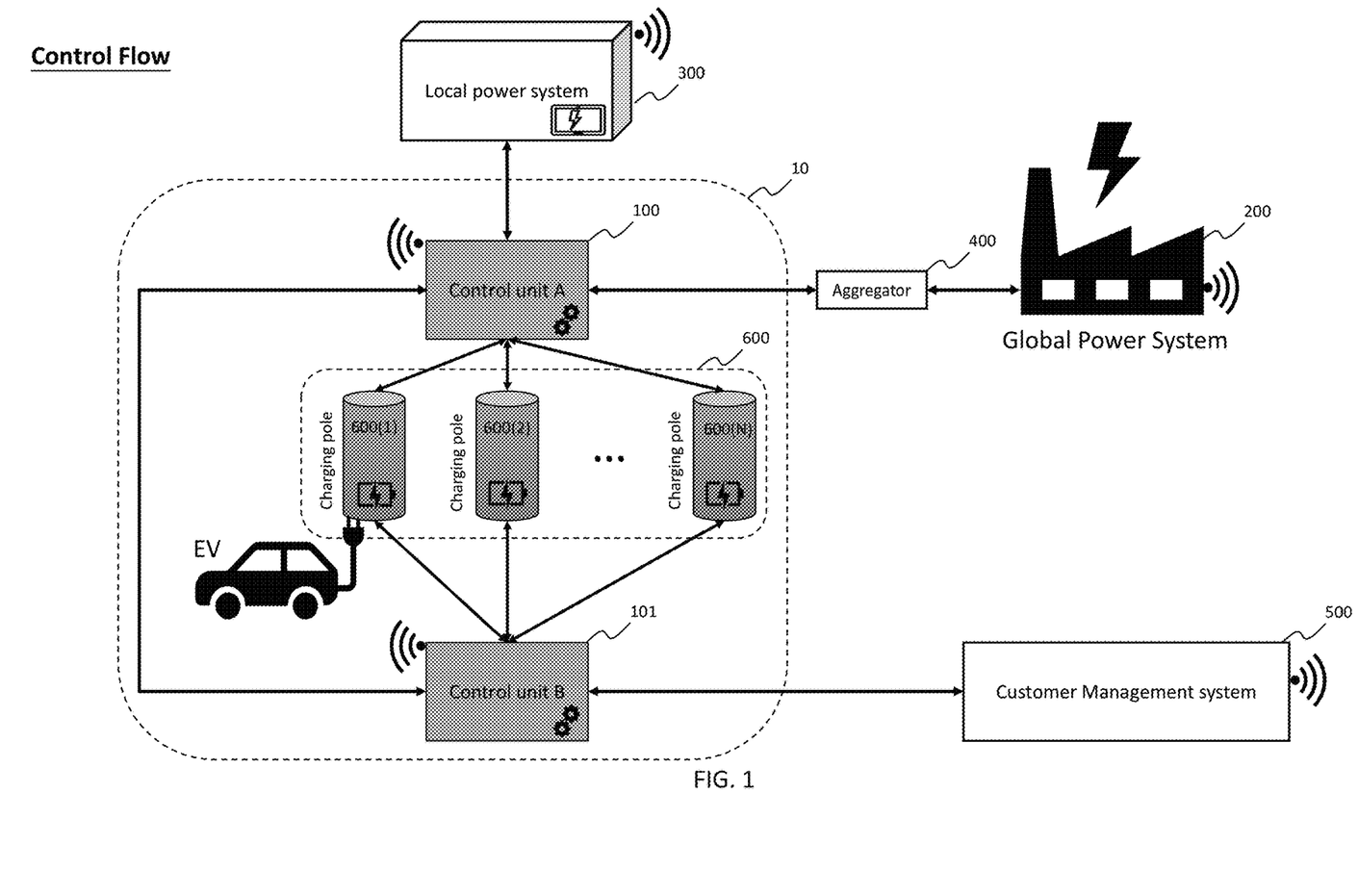
FIG. 1 depicts a schematic diagram illustrating the control flow of a charging pole power management system in accordance with one embodiment of the present invention.
Figure 2A:
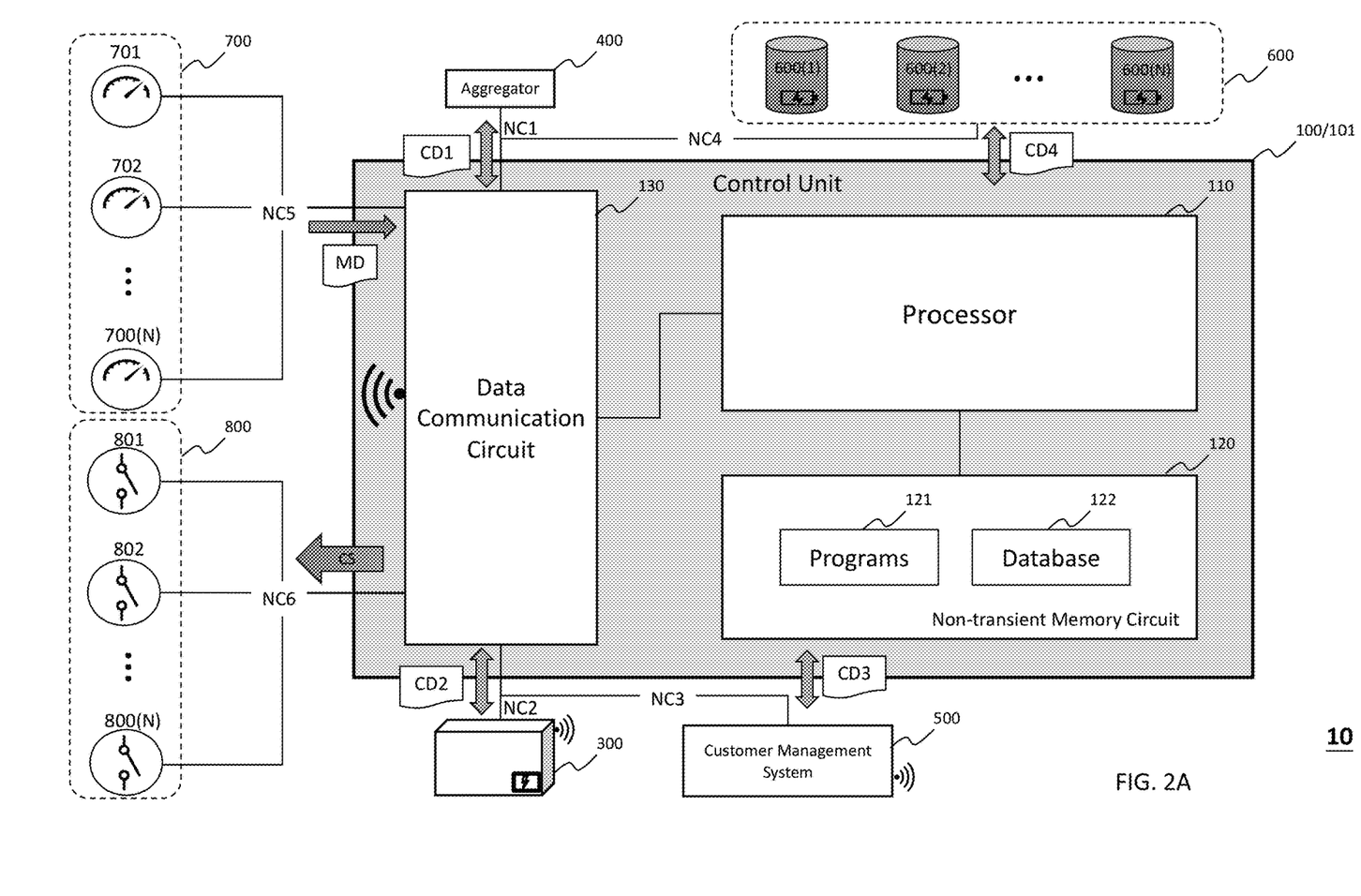
FIG. 2A depicts a block diagram illustrating the charging pole power management system.

Referring to FIG. 1 and FIG. 2A for the following description, the charging pole power management system 10 includes one or more control units 100 (and 101), one or more charging poles 600, one or more measuring devices 700 and one or more cutoff points (or switches) corresponding to the one or more charging poles 600, the local power system 300, and the global power system 200.

Each (e.g., the control unit 100 or control unit 101) of the one or more control units includes a processor 110, a non-transient memory circuit 120 and a data communication circuit 130. The non-transient memory circuit 120 is configured to store programs 121 (or machine instructions 121) and to host the database 122. The database 122 may be used to store the monitoring data MID, controlling data CD1 to CD4. The data communication circuit 130 is configured to establish the network connections NC1 to NC6, which may be wired or wireless data communication connections.

Within the control flow illustrated by FIG. 1, the control unit 100 coordinates with the global power system 200, local power system 300 and the charging poles 600 via the intermediate networks; the control unit 101 coordinates with the off-site customer management system 500 and the charging poles 600 via the intermediate networks. The on-site control unit 100 (also known as a control loop) manages the power system's constraints or requirements and transmits corresponding commands to the charging poles 600 to meet the constraints. The power system constraints of both the local power system 300 and the global power system 200 will be computed by the control unit 100 and translated into instructions for various charging poles, so as to control the charging poles 600 to meet all the power system constraints or taken up most available power system capacity. The control loop 100 and the control loop 101 are two different methods that control the charging poles 600. These control loops use different control protocols and different conveying channels.

The global power system 200 is the power system that provides the source of power to local power system 300. The local power system 300 is the on-premises power system that is providing the source power to the charge poles 600. The off-site aggregator 400 collects information outside the premises about the power system. It also collects the charger usage pattern as transmitted from the local information concentrator (not shown). The aggregator 400 is responsible for computing the power system's constraint/surplus or command. The Control unit A 100 is responsible of collecting information of local power system for computing the local power system constraint/surplus or command. The local power system constraint/surplus or command can be transferred by the controlling data CD1. The control unit 100 can reduce/increase the power consumption of any one of charge poles 600 at a particular moment according to commands sent from the aggregator 400 plus local power system constraint/surplus or command computed by itself. When needed, the percentage of a demand response command is computed and sent to the control unit 100 to execute. The control unit 100 then reduces/increase the power consumption of relevant charge poles 600 to satisfy all global and local power system constraint/surplus plus demand response command.

The customer management system 500 manages activating/deactivating/prioritizing the charge poles 600 based on business rules. The customer management system 500 sends the control commands or rules or charge rate priority to the control unit 101 via the controlling data CD3.

Control unit 100 and control unit 101 are two independent control units/loops that ensure the power system constraint to the charger poles 600 can be received and executed by the charging poles 600. The power system constraint indicates the different types of allowances related to power, energy, current, voltage, thermal characteristics. Theses allowances are determined by at least one of the global power system 200, the local power system 300 and the aggregator 400. The allowances can be identified from the controlling data CD1 and CD2.

Figure 2B:
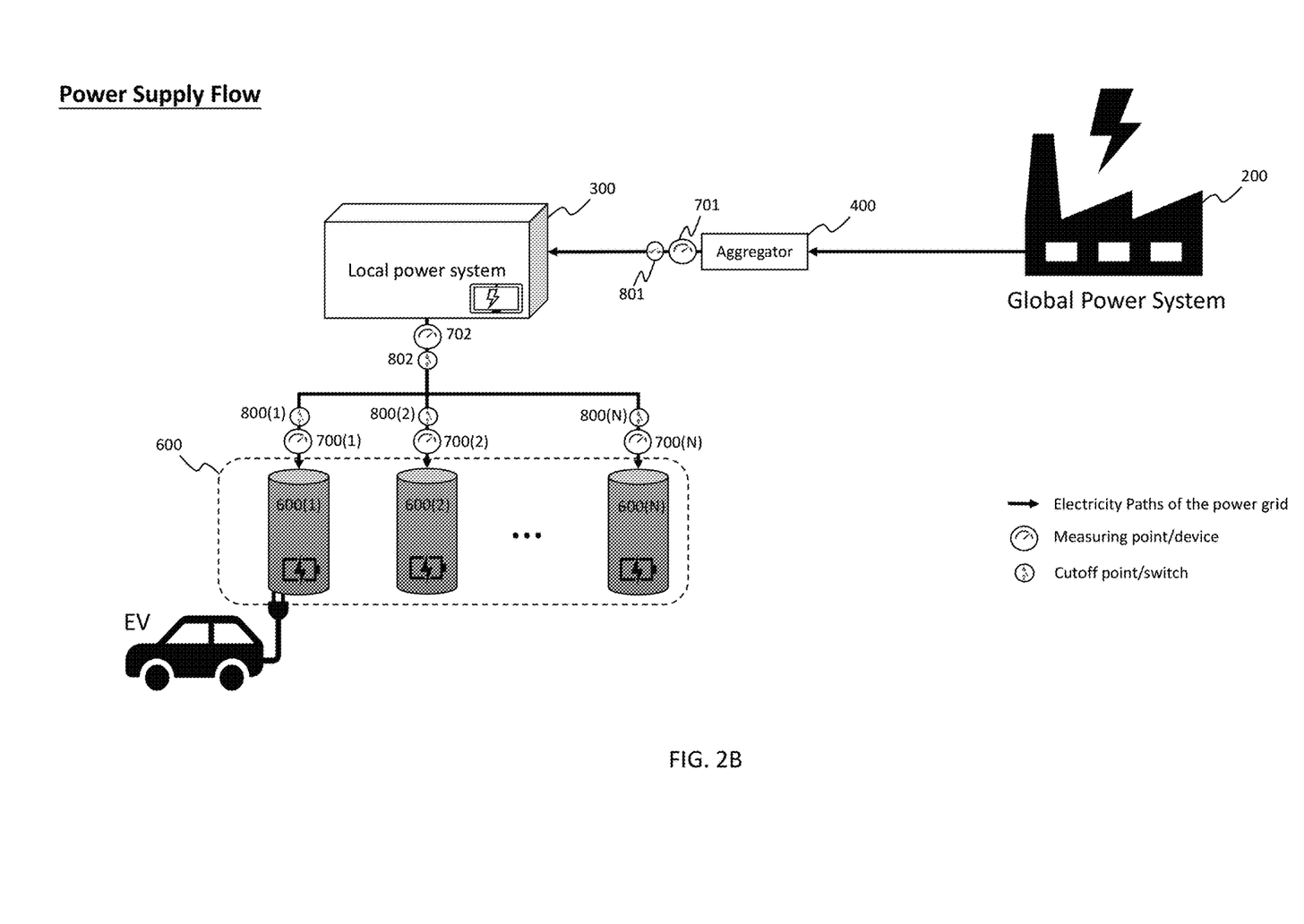
FIG. 2B depicts a schematic diagram illustrating the power supply flow of a charging pole power management system in accordance with one embodiment of the present invention.

Referring to FIG. 2B, the measuring devices 700 are, for example, sensors placed at multiple points of the power line/grid of the global power system 200 and the local power system 300. The measuring devices 700 sense the electric/thermal characteristics of the power grid's electricity, so as to obtain corresponding measuring values. The measuring devices 700 further transfer monitoring data MD, including the measuring values, to the control unit 100 via the network connection NC5. The monitoring data MD can further include auxiliary information. The auxiliary information includes, for example, the identification of the measuring device(s) corresponding to the measuring values and time information corresponding to the measuring values.

The cutoff points 800 are, for example, switches disposed at the power (line) grid of the global power system 200 and the local power system 300. The control unit 100 can transfer control signal CS to one or more of the cutoff points 800 for stopping/resuming the corresponding electricity path(s) of the power grid as a backup to satisfy all power system constraints locally and globally.

The processor 110 executes the machine instructions 121 to implement methods for performing a charging modulation between one or more charging poles 600, the local power system 300, and the global power system 200.

Figure 3:
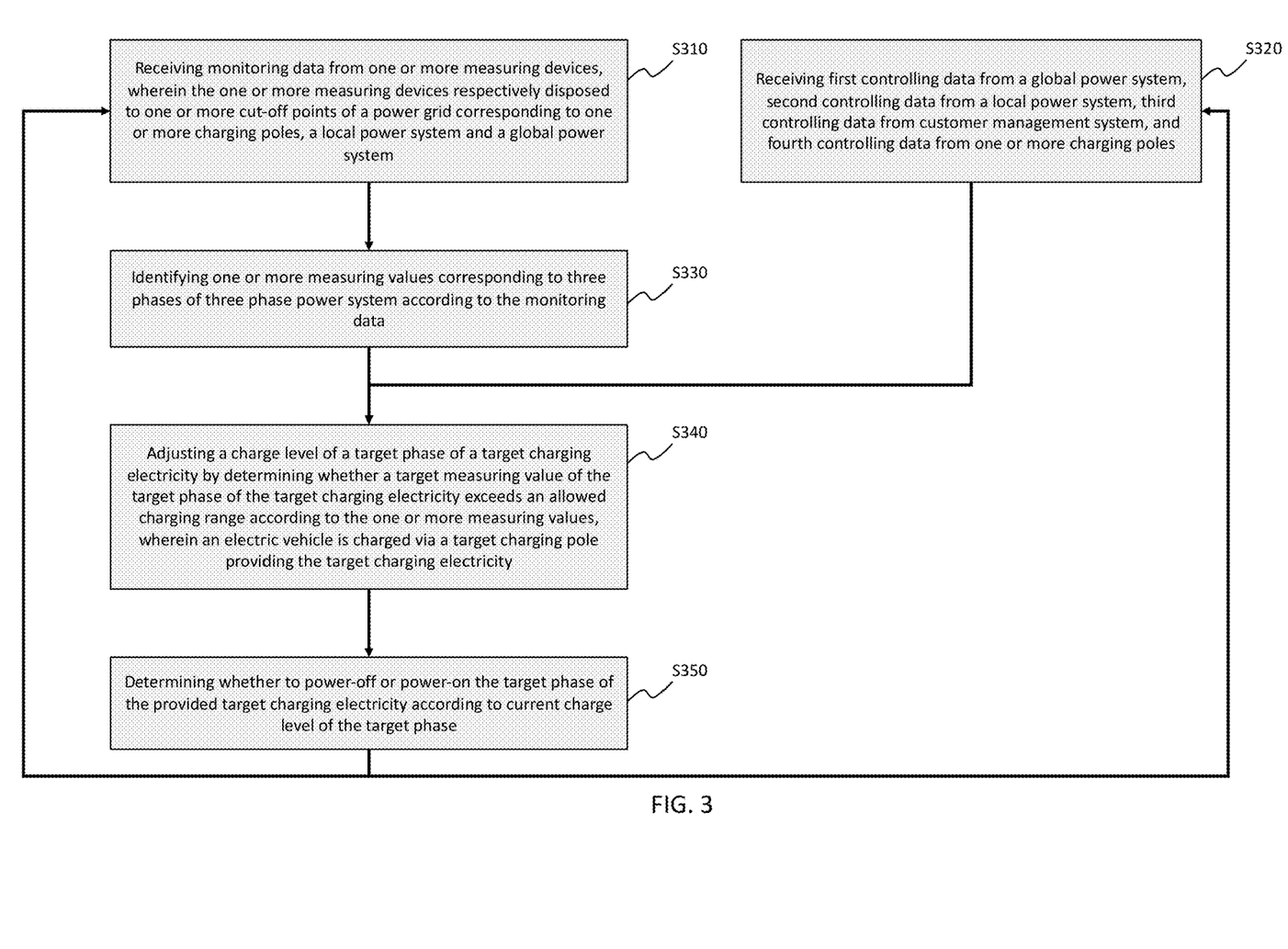
FIG. 3 depicts a flowchart of a charging modulation method implemented by the control unit of a charging pole power management system.

Referring to FIG. 3, in step S310 the processor 110 receives monitoring data MD from one or more measuring devices, wherein the one or more measuring devices respectively assigned to one or more cut-off points of a power grid correspond to one or more charging poles, a local power system and a global power system. The processor 110 can receive the monitoring data MD every predefined interval (e.g., X seconds).

Next, in step S330 the processor 110 identifies one or more measuring values corresponding to phases of a three-phase power system according to the monitoring data MD. The three-phase power system includes a three-wire AC power circuit with each phase's AC signal 120 electrical degrees apart. Different phases of a three-phase power system are computed separately to achieve maximum allocation.

Furthermore, in step S320, the processor 110 receives first controlling data CD1 from a global power system, then second controlling data CD2 from a local power system, third controlling data CD3 from the customer management system, and fourth controlling data CD4 from one or more charging poles.

The first controlling data CD1 includes: a decrease of net charging rate in a local power system; the complete stoppage of all current and upcoming charging; seasonal, monthly, date of week, time of day scheduling; and ad-hoc modulation according to an on-off schedule and rate of reduction of charging rate. The second controlling data CD2 includes: a decrease of current/power limit of any branch of power flow from the global power system to the local power system to the charging pole; complete stoppage of all current and upcoming charging; seasonal, monthly, date of week, time of day scheduling; and change of available total capacity from local power system economy of cost of energy. The third controlling data CD3 includes: start/stop of charging; raise/lower of priority; rate of charging; and seasonal, monthly, date of week, time of day scheduling. The fourth controlling data CD4 includes: start/stop of charging; raise/lower of priority; suspension/resumption of charging; rate of charging; and state of charge of connected EV.

The processor 110 can receive different controlling data along further predefined intervals (e.g., Y minutes). The controlling data includes information related to one or more preset schedules, one or more demand response commands, one or more tariff tables, one or more external power inputs, and one or more power system constraints. The energy allocations for the charging poles 600 can be determined according to the controlling data. The preset schedules, for example, record different allowed allocation capacities corresponding to different time periods during different dates. One of the demand response commands, for example, instructs that the current allocations for the charging poles

600 should be decreased for a particular period. The tariff tables record fluctuations in charging/energy fees during different periods or dates. The allocations for the charging poles 600 can be determined/calculated according to the tariff tables. Information related to the external power inputs indicates the energy capacities provided by one or more external power sources other than the global power system. The more external power sources, the more allocations determined to the charging poles 600.

Next, in step S340 the processor 110 adjusts a charge level of a target phase of a target charging electricity by determining whether a target measuring value of the target phase of the target charging electricity exceeds an allowed charging range according to the one or more measuring values, wherein an electric vehicle (EV) is charged via a target charging pole providing the target charging electricity.

Figure 4:
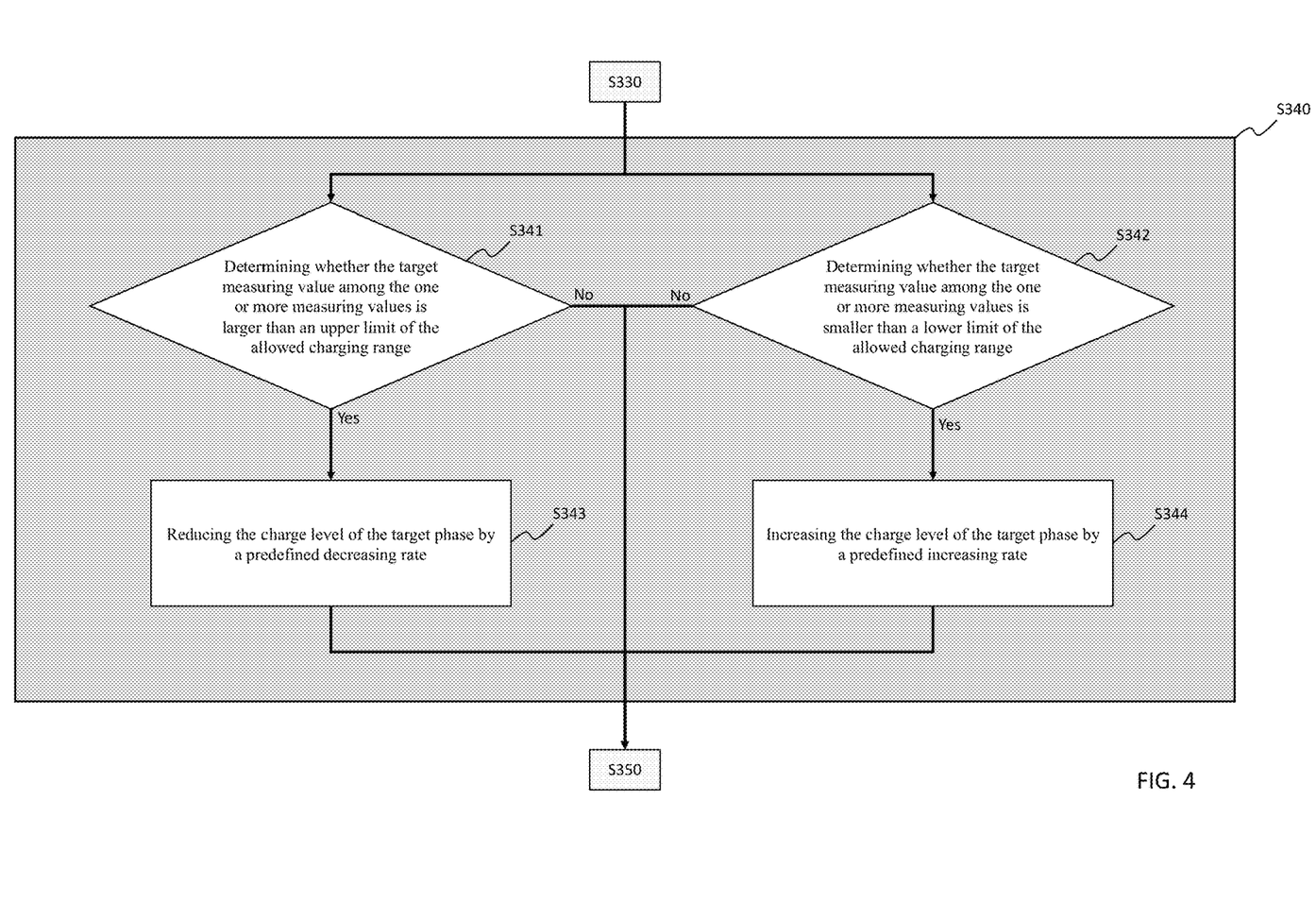
FIG. 4 depicts a flowchart of step S340 illustrated in FIG. 3.

Specifically, referring to FIG. 4, in step S341 the processor 110 determines whether the target measuring value among the one or more measuring values is greater than the defined upper limit of the allowed charging range. The target measuring value here means one measuring value that is higher than the upper limit when performing step S341. If the processor 110 determines that the target measuring value (e.g., energy or current of the target phase of the target charging electricity) is greater than the upper limit of the allowed charging range, in step S343 the processor 110 reduces the charge level of the target phase by a predefined decreasing rate (e.g., N %). Subsequently, the corresponding energy, voltage or current of the target phase of the target charging electricity can be decreased accordingly, and the transfer speed/amount of the energy allocation for the target charging pole can be decreased as well. Otherwise, if all the measuring values are not higher than the upper limit, the processor 110 will not reduce the charge level of any phase of the charging electricity.

Furthermore, in step S342 the processor 110 determines whether the target measuring value among the one or more measuring values is beneath a lower limit of the allowed charging range. The target measuring value here means one measuring value that is under the lower limit when performing step S342. If the processor 110 determines that the target measuring value is under the lower limit of the allowed charging range, in step S344 the processor 110 increases the charge level of the target phase by a predefined increasing rate (e.g., M %). Subsequently, the corresponding energy, voltage or current of the target phase of the target charging electricity can be increased accordingly, and the transfer speed/amount of the energy allocation for the target charging pole can be increased as well. Otherwise, if all the measuring values are not under the lower limit, the processor 110 will not increase the charge level of any phase of the charging electricity.

The charge level indicates the percentage of full charging rate, with "%" representing its units.

The allowed charging range is determined according to a target allocation. The target allocation is an allocation corresponding to the target charging pole, out of one or more allocations corresponding to the one or more charging poles. The upper limit, the lower limit, the predefined decrease rate and the predefined increase rate are determined/calculated according to the allocation (e.g., the target allocation) assigned to the target charging electricity corresponding to the target charging pole. The one or more allocations for the charging poles 600 are calculated according to at least one of the first controlling data CD1, the second controlling data CD2, the third controlling data CD3 and/or the fourth controlling data CD4. In another embodiment, the one or more allocations are further determined according to one or more energy sources belonging to the global power system and the local power system.

In an embodiment, a priority allocation is determined and added to the target allocation when at least one of following conditions is determined:

(a) the EV has charging priority. For example, this may be an EV undertaking an emergency mission, an EV with a VIP authorization for the charging pole system, or an EV to which the control unit 100/101 has assigned a priority identity.

(b) the target charging pole has charging priority (can be customized on customer or business choice) itself. For example, a charging pole is set for particular EV(s). The charging fee of this kind of charging pole is more than a normal charging pole's.

(c) the target charging pole has a further charging priority right on global power system needs.

(d) the start charging time of the target charging pole is later than the start charging time of other charging poles. For example, a newly arrived EV can be assigned priority status.

(e) the amount of one or more unused allocations among the calculated allocations is greater than a predefined amount.

The charge level can be decreased to meet the power system constraints or be increased to employ the local/global power system's available capacity. The increase/decrease rate is dynamically adjusted in response to the changes in power system and constrains existing charging loads connected to the global/local power system. The control unit 100/101 transmits to the target charging pole one or more instructions (e.g., via the controlling data CD4) adjusting the charge level by the predefined rate.

Returning to FIG. 3, in step S350 the processor 110 determines whether to turn the target phase of the provided target charging electricity on or off according to the target phase's current charge level.

Figure 5:
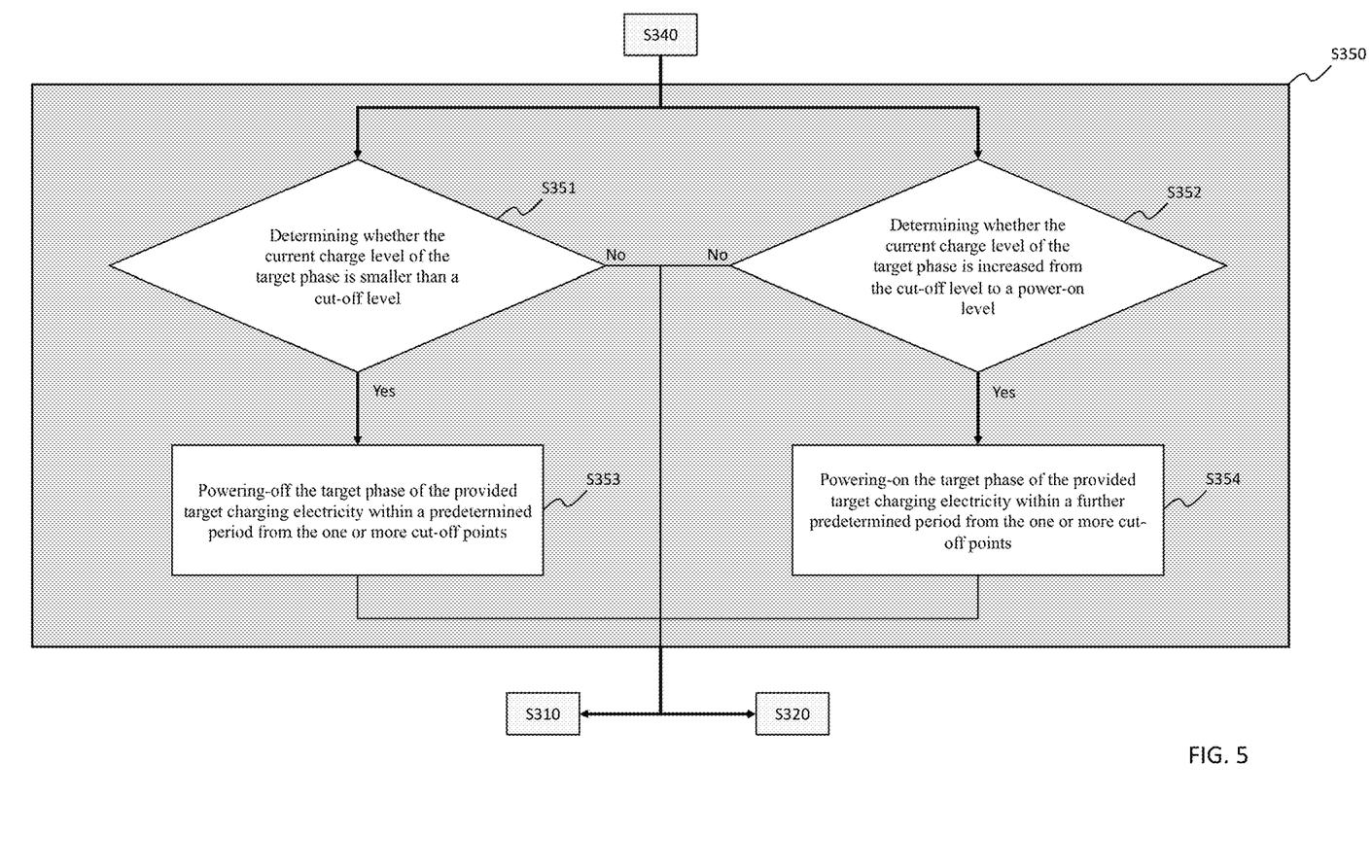
FIG. 5 depicts a flowchart of step S350 illustrated in FIG. 3.

Specifically, referring to FIG. 5, in step S351 the processor 110 determines whether the current charge level of the target phase is lower than the cutoff level. If the current charge level of the target phase is determined to be lower than the cutoff level, in step S353 the processor 110 turns off the target phase of the provided target charging electricity within a predetermined period from the one or more cutoff points. For example, the processor 110 sends a control signal CS to the cutoff point(s)/switch(es) corresponding to the target charging electricity to turn off the target phase.

Furthermore, in step S352 the processor 110 determines whether the current charge level of the target phase has increased from the cutoff level to a power-on level. If the target phase's current charge level is determined to have increased from the cutoff level to the power-on level (which is higher than the cutoff level), in step S354 the processor 110 activates the target phase of the provided target charging electricity within a further predetermined period from the one or more cutoff points. For example, the processor 110 sends a further control signal CS to the cutoff point(s)/switch(es) of the target charging electricity to resume the target phase. In another embodiment, if the current charge level of the target phase is determined to be higher than the cutoff level, the processor 110 activates the target phase.

The predetermined periods are decided according to the corresponding power system's constraints. For example, to prevent critical failure of the global/local power system the predetermined period can be set as three minutes.

In the embodiment, referring to FIG. 2A, the monitoring data MD is transferred via a wired or wireless network (e.g., NC5) established between the measuring devices 700 and the control unit 100/101. The first controlling data CD1, the second controlling data CD2, the third controlling data CD3 and the fourth controlling data CD4 are transferred via a further wired or wireless network (e.g., NC1 to NC4) leading from the control unit 100/101 to the global power system 200, the local power system 300, the customer management system 500 and the charging poles 600.

The modulation and corresponding operations are still functional even during complete loss of wireless network connection by at least one of following methods.

(1) Multiple control units that are connected wirelessly or by hardwire or power line carrier. When the wireless network connection between the multiple control units is lost, each control unit has an entire or partial backup image of the system and will perform the foregoing calculation, such that the power system impact due to the lost of wireless network connection can be minimized.

(2) The measuring devices provide information to the control unit wirelessly. The control unit can detect the loss of data and shift into another state of operation to protect the global/local power system.

(3) The control signal to the EV could be wired or wireless. To maintain backup protection for system behavior reflected into the power system upon loss of control, a basic degree of redundancy control has been added. This sectionalized part of the system is confined to the relevant part that has lost control.

(4) Edge computer devices placed in the charging poles possess an automatic detection algorithm that can modulate charging in case of losing wireless network connection to the control units. When an edge computer device in the corresponding charging pole detects a loss of wireless network connection, the device can modulate charging only to the corresponding charging pole according to the received monitoring data for that charging pole and the recorded controlling data.

(5) The majority of control commands/signals will be transmitted via hard-wired connection between the controller and edge computer devices or via robust power line carrier.

When the further wired or wireless network is disconnected, the control unit 100/101 establishes a power line network, wherein the first controlling data CD1, the second controlling data CD2, the third controlling data CD3 and the fourth controlling data CD4 can be transferred via the power line network.

After connection to the wireless network resumes, information about the modulations performed while the wireless network connection was missing will be delivered to the control unit 100. The control unit 100 can then resume modulating charging according to the received information.

The control unit 100/101 records the changes in usage of all the allocations and sends related information (e.g., allocations history) to the global power system 200. The global power system 200 can measure the amount of controllable EV load connected and determine whether curtailing the controllable EV load, according to the allocations history, is technically necessary or economically beneficial. This is the grid value measurement during flexible EV charging.

The functional units of the apparatuses and the methods in accordance to embodiments disclosed herein, such as the processor of the analysis server, may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Machine instructions or firmware/software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include non-transient memory circuits and/or computer storage media having data and/or machine instructions or firmware/software codes stored therein which can be used to program the processors to perform any of the methods of the present invention. The non-transient memory circuits and/or storage media include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium. The communication networks established in the various embodiments support various communication protocols such as, without limitation, Wi-Fi, the Global System for Mobile Communication (GSM) system, the Personal Handy-phone System (PHS), Code Division Multiple Access (CDMA) system, Worldwide Interoperability for Microwave Access (WiMAX) system, third-generation wireless communication technology (3G), fourth-generation wireless communication technology (4G), fifth-generation wireless communication technology (5G), Long-term Evolution technology (LTE), Bluetooth, and Ultra-Wideband (UWB).

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for performing a charging modulation between one or more charging poles, a local power system and a global power system by one or more control units of a charging pole power management system, wherein the charging pole power management system comprises the one or more charging poles and the one or more control units having one or more processors, the method comprising:

receiving, by the processors, monitoring data from one or more measuring devices, wherein the one or more measuring devices respectively disposed to one or more cut-off points of a power grid corresponding to the one or more charging poles, the local power system and the global power system;

receiving, by the processors, first controlling data from the global power system, second controlling data from the local power system, third controlling data from a customer management system, and fourth controlling data from the one or more charging poles;

identifying, by the processors, one or more measuring values corresponding to three phases of three phase power system according to the monitoring data;

adjusting, by the processors, a charge level of a target phase of a target charging electricity by determining whether a target measuring value of the target phase of the target charging electricity exceeds an allowed charging range according to the one or more measuring values, wherein an electric vehicle is charged via a target charging pole providing the target charging electricity; and determining, by the processors, whether to power-off or power-on the target phase of the provided target charging electricity according to current charge level of the target phase.

2. The method of claim 1, wherein
the allowed charging range is determined according to a target allocation,
wherein an adjustment for the charge level is determined according to the target allocation,
wherein the target allocation is one allocation corresponding to the target charging pole among one or more allocations corresponding to the one or more charging poles,
wherein the one or more allocations are calculated according to at least one of the first controlling data, the second controlling data, the third controlling data and the fourth controlling data.

3. The method of claim 1, the step of adjusting the charge level of the target phase of the target charging electricity by determining whether the target measuring value of the target phase of the target charging electricity exceeds the allowed charging range according to the one or more measuring values comprises:
determining whether the target measuring value among the one or more measuring values is larger than an upper limit of the allowed charging range, wherein the upper limit is calculated according to a predefined upper bound and an upper margin,
wherein if the target measuring value is larger than the upper limit, reducing the charge level of the target phase by a predefined decreasing rate; and
determining whether the target measuring value is smaller than a lower limit of the allowed charging range, wherein the lower limit is calculated according to a predefined lower bound and a lower margin,
wherein if the target measuring value is smaller than the lower limit, increasing the charge level of the target phase by a predefined increasing rate.

4. The method of claim 1, wherein the step of powering-off or powering-on the target phase of the provided target charging electricity according to the current charge level of the target phase comprises:
determining whether the current charge level of the target phase is smaller than a cut-off level,
wherein if the target phase is smaller than the cut-off level, powering-off the target phase of the provided target charging electricity within a predetermined period from the one or more cutoff points; and determining whether the current charge level of the target phase is increased from the cut-off level to a power-on level,
wherein if the current charge level of the target phase is increased from the cut-off level to the power-on level, powering-on the target phase of the provided target charging electricity within a further predetermined period from the one or more cut-off points.

5. The method of claim 1, wherein
the monitoring data is transferred via a wired and/or wireless network established between the measuring devices and the control unit,
the first controlling data, the second controlling data, the third controlling data and the fourth controlling data is transferred via a further wired and/or wireless network established from the control unit to the global power system, the local power system, the customer management system and the charging poles,
wherein when the further wired or wireless network is disconnected, the control unit establishes a power line network, wherein the first controlling data, the second controlling data, the third controlling data and the fourth controlling data are transferred via the power line network.

6. The method of claim 2, wherein
the one or more allocations are further determined according to one or more energy sources belonging to the global power system and the local power system.

7. The method of claim 2, wherein a priority allocation is determined and added with the target allocation when at least one of following conditions is determined:
the charged electric vehicle has a charging priority right;
the target charging pole has a further charging priority right on customer or business choice;
the target charging pole has a further charging priority right on global power system needs;
a start charging time of the target charging pole is later than the start charging time of each of other charging poles; and
the amount of one or more unused allocations among the calculated allocations is larger than a predefined amount.

8. The method of claim 2, wherein the first controlling data comprises:
a decrease of net charging rate in a local power system;
the complete stoppage of all current and upcoming charging;
seasonal, monthly, date of week, time of day scheduling; and
ad-hoc modulation according to an on-off schedule and rate of reduction of charging rate,
wherein the second controlling data comprises:
a decrease of current/power limit of any branch of power flow from the global power system to the local power system to the charging pole;
complete stoppage of all current and upcoming charging;
seasonal, monthly, date of week, time of day scheduling; and
change of available total capacity from local power system economy of cost of energy,
wherein the third controlling data comprises:
start/stop of charging;
raise/lower of priority;
rate of charging; and
seasonal, monthly, date of week, time of day scheduling,
wherein the fourth controlling data comprises:
start/stop of charging;

raise/lower of priority;
suspension/resumption of charging;
rate of charging; and
state of charge of connected EV.

9. A charging pole power management system for performing a charging modulation between one or more charging poles, a local power system and a global power system, comprising:
the one or more charging poles;
one or more measuring devices, respectively disposed to one or more cut-off points of a power grid corresponding to the one or more charging poles, the local power system and the global power system;
one or more control units, connected to the global power system, the local power system, a customer management system, the one or more charging poles, and the one or more measuring devices via corresponding networks,
wherein each of the one or more control units comprises a processor configured to execute machine instructions to implement a computer implemented method, the method comprising:
receiving monitoring data from the one or more measuring devices;
receiving first controlling data from the global power system, second controlling data from the local power system, third controlling data from the customer management system, and fourth controlling data from the one or more charging poles;
identifying one or more measuring values corresponding to three phases of three phase power system according to the monitoring data;
adjusting a charge level of a target phase of a target charging electricity by determining whether a target measuring value of the target phase of the target charging electricity exceeds an allowed charging range according to the one or more measuring values, wherein an electric vehicle is charged via a target charging pole providing the target charging electricity; and
determining whether to power-off or power-on the target phase of the provided target charging electricity according to current charge level of the target phase.

10. The charging pole power management system of claim 9, wherein the step of adjusting the charge level of the target phase of the target charging electricity by determining whether the target measuring value of the target phase of the target charging electricity exceeds the allowed charging range according to the one or more measuring values comprises:
determining whether the target measuring value among the one or more measuring values is larger than an upper limit of the allowed charging range, wherein the upper limit is calculated according to a predefined upper bound and an upper margin,
wherein if the target measuring value is larger than the upper limit, reducing the charge level of the target phase by a predefined decreasing rate; and
determining whether the target measuring value is smaller than a lower limit of the allowed charging range, wherein the lower limit is calculated according to a predefined lower bound and a lower margin,
wherein if the target measuring value is smaller than the lower limit, increasing the charge level of the target phase by a predefined increasing rate,
wherein the step of powering-off or powering-on the target phase of the provided target charging electricity according to the current charge level of the target phase comprises:
determining whether the current charge level of the target phase is smaller than a cut-off level,
wherein if the target phase is smaller than the cut-off level, powering-off the target phase of the provided target charging electricity within a predetermined period from the one or more cut off points; and
determining whether the current charge level of the target phase is increased from the cut-off level to a power-on level,
wherein if the current charge level of the target phase is increased from the cut-off level to the power-on level, powering-on the target phase of the provided target charging electricity within a further predetermined period from the one or more cut-off points.

* * * * *